(No Model.)
E. A. RIX.
HOSE COUPLING.
No. 255,335. Patented Mar. 21, 1882.
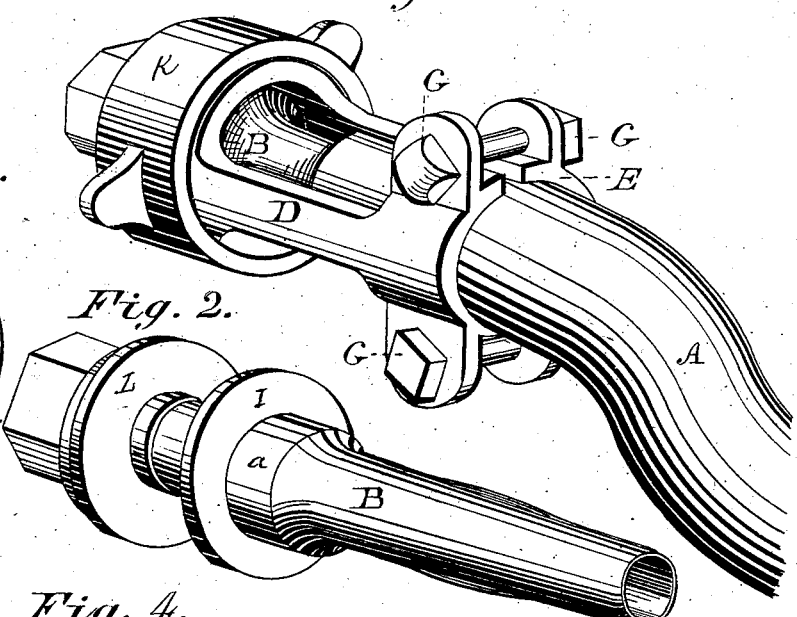
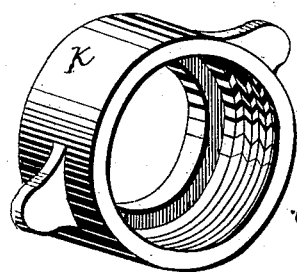
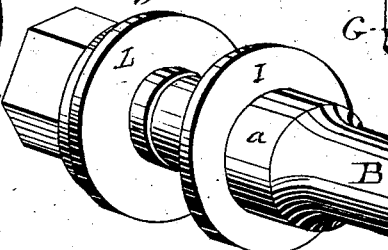
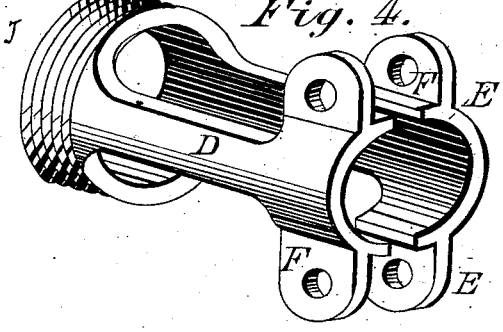
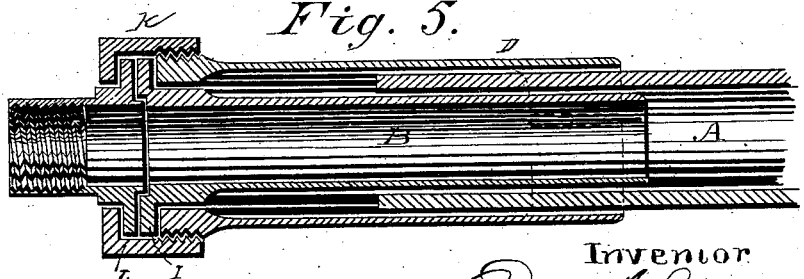
Witnesses
Geo. H. Strong
Frank A. Brooks
Inventor
Edward A. Rix
By Dewey & Co. Attys

UNITED STATES PATENT OFFICE.

EDWARD A. RIX, OF SAN FRANCISCO, CALIFORNIA.

HOSE-COUPLING.

SPECIFICATION forming part of Letters Patent No. 255,335, dated March 21, 1882.

Application filed October 28, 1881. (No model.)

*To all whom it may concern:*

Be it known that I, EDWARD A. RIX, of the city and county of San Francisco, State of California, have invented an Improved Hose-Coupling; and I hereby declare the following to be a full, clear, and exact description thereof.

My invention relates to a device for securing the ends of flexible hose to couplings.

My invention consists in certain details of construction, as hereinafter described and specifically claimed.

Referring to the accompanying drawings, Figure 1 is a view showing the hose secured to the coupling. Figs. 2, 3, and 4 show the parts of the coupling and clamp separated. Fig. 5 is a longitudinal section.

A is one end or portion of a hose-coupling such as is employed to connect lengths of hose so as to make a continuous tube. The coupling device proper may be of any suitable or convenient form, this portion not concerning my present invention.

B is an extension or tube having an exterior diameter which will allow it to be inserted into the end of the hose, and it may have a slight swell or enlargement, as shown at $a$, for additional security, and is provided with the flange I, as shown in Fig. 2. The interior opening or bore forms a continuation of the interior of the hose and a continuous passage therewith.

From the enlarged flange of the coupling two elastic arms, D, extend back parallel with the tube B, and at such a distance from it as will admit the end of the hose to pass inside of them when it is slipped over the tube B. The said flange J is provided with a male screw-thread, as shown in Fig. 4, to receive over it the band K, provided with the female screw, as shown in Fig. 3. These arms are placed opposite each other, and are of some breadth, and their inner surfaces are made concave, so as to fit the exterior shape of the hose. At their ends they have extensions E in the form of bands, each of which extends about half-way around the hose, and lugs F project from these semi-bands. These lugs have holes formed through them to admit screw-bolts G with nuts, by which they may be drawn together, and the bands and arms thus caused to clamp the hose firmly upon the extension-tube B.

Having thus described my invention, what I claim as new, and desire to secure by Letters Patent, is—

The hose-coupling herein described, consisting of the tube B, fitting within section A of hose, and provided with a flange, against which abuts the flange L, in combination with the ring K, the clamp D, provided at one end with a male screw and at the other end with sectional ring E, having fastening-lugs F, and bolts G, all constructed and arranged as set forth.

In witness whereof I hereunto set my hand.

EDWARD A. RIX.

Witnesses:
S. H. NOURSE,
GEO. H. STRONG.